Figure 1:
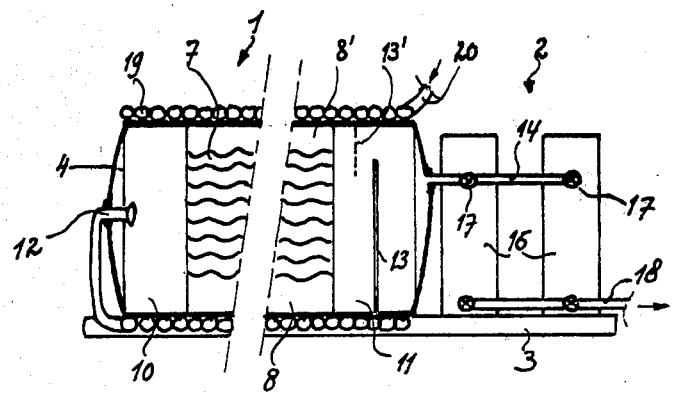

United States Patent [19]

Pielkenrood

[11] 4,442,000
[45] Apr. 10, 1984

[54] EASILY TRANSPORTABLE WATER PURIFICATION DEVICE

[75] Inventor: Jacob Pielkenrood, Krommenie, Netherlands

[73] Assignee: Pielkenrood-Vinitex Beheer B.V., Assondelft, Netherlands

[21] Appl. No.: 341,311

[22] Filed: Jan. 21, 1982

[30] Foreign Application Priority Data

Jan. 29, 1981 [NL] Netherlands .......................... 8100443

[51] Int. Cl.³ ........................................... B01D 21/08
[52] U.S. Cl. ................................... 210/256; 210/261; 210/299; 210/DIG. 5
[58] Field of Search ............... 210/802, 804, 806, 256, 210/259, 261, 295, 299, 521, DIG. 5, 241

[56] References Cited

U.S. PATENT DOCUMENTS 3,630,365 12/1971 Woodbridge et al. .............. 210/241
3,774,768 11/1973 Turner ................................. 210/295
4,315,822 2/1982 Jaisinghani .................... 210/DIG. 5

Primary Examiner—Ivars C. Cintins
Attorney, Agent, or Firm—Beehler, Pavitt, Siegemund, Jagger & Martella

[57] ABSTRACT

An easily transportable water purification device, comprising a closed tank in which a plate separator is arranged, and between the inlet for the water to be treated and the inlet connection of said tank a tube coalescer is included for obtaining coalescence of particles suspended in the water. Said coalescer is a tube wound around the tank, and in particular an elastic hose, providing impact protection of the tank. Inside said tank additional storage chambers can be provided laterally of the plate separator.

6 Claims, 2 Drawing Figures

U.S. Patent        Apr. 10, 1984        4,442,000

EASILY TRANSPORTABLE WATER PURIFICATION DEVICE

In remote areas providing drinking water is often a big problem, and transporting water is often very objectionable because of the distance and/or bad connections. This is, for instance, the case for isolatedly working groups of technicians, geologists, army units etc. Also locally purifying river or ground water can be objectionable if conveying a water purification device is difficult. Moreover the current water purification devices are not adapted to relatively small groups of users, and are not suitable for being transported along difficultly passable roads nor for being lowered from an aeroplane.

Simple water purification devices generally comprise a plate separator in which sedimentatable and/or flotatable components can be removed from the water, if necessary after adding separation promoting auxiliary substances to the water, the water, after having passed through the plate separator, is generally also filtered, e.g. in a sand filter, and sometimes also disinfectants are added, e.g. chlorine compounds, in order to eliminate noxious micro-organisms which are not separated or filtered out.

It is an object of the invention to provide such a separator, which is, in particular, intended for being used in remote or difficultly accessible areas, and which is, to that end, constructed in an easily transportable manner, and, in particular, can be lowered from an aeroplane. This device according to the invention comprises a tank with an inlet and an outlet chamber and a plate separator arranged there-between, said inlet chamber communicating with a supply connection for the water to be purified, and said outlet chamber communicating with a filter assembly, which device is characterised in that, between the supply connection and the inlet chamber, a tube coalescence apparatus is included, having the form of a tube wound in a single or multiple winding around the tank, said tube preferably consisting of an elastic material, and in particular is made of a chemically resistant plastics such as neoprene.

The use of a coalescence apparatus, in which, as a consequence of the flow velocity difference occurring therein, suspended particles can overtake one another and, then, can clot together, has as a consequence that the separation effect is improved, so that, with a separator of relatively small dimensions, nevertheless a good separation effect can be obtained. Since, now, according to the invention, this coalescence apparatus is constructed as a tube wound around the tank, this device takes very little space, so that the dimensions of the device are not substantially increased. If the tube is made of an elastic material, it will act as a buffer protecting the tank during transport. This is particularly favourable if such a tank is to be lowered by means of a parachute.

Preferably the plate separator is a cross-flow separator having a longitudinal axis which is parallel to the longitudinal axis of the tank, the plates being directed parallel to said longitudinal axis, their inclination being transversely to this longitudinal axis.

Preferably the tank has a circular cross-section, the plate separator then having a rectangular cross-section, and the space inside the tank intended for the plate separator is defined by lateral walls which, together with the cylindrical tank wall, define two chambers which may be used for storing water or auxiliary substances.

Figure 2:
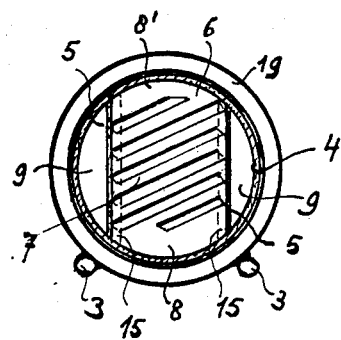

The invention will be elucidated below in more detail by reference to a drawing of an embodiment, showing in:

FIG. 1 a longitudinal section of this device; and
FIG. 2 a cross-section on line II—II of FIG. 1.

The device of the invention comprises two main parts, viz. a separator part 1 and a filter part 2, which are mounted on a common frame 3. On this frame further parts can be mounted such as pumps, and in particular measuring pumps for adding auxiliary substances to the water. These additional parts are not shown.

For supplying the water to be treated, generally a motor pump is used, which can be constructed as a separate unit. Said pump can be driven by a diesel engine, but, if a current supply is available, also electric pumps can be used.

The separator part 1 comprises a tank 4 with a circular cross-section, inside which, by means of two partitions 5 which are, in the operative position, vertically directed, a separator space 6 is defined within which a plate assembly 7 of a cross-flow separator is present. The space 8 below this separator is adapted for collecting separated heavy components which, by means of a discharge connection not shown, can be drawn off. If necessary, the space 8' above the separator 7 can be provided with a discharge opening for removing flotating components. The partitions 5 define, moreover, two lateral spaces 9, which can be used for storing water or auxiliary substances to be added to the water, such as substances for influencing the separation and/or the acidity, disinfection substances and the like.

At the extremities of the tank 4 an inlet chamber 10 and an outlet chamber 11 are situated. In the inlet chamber 10 a flow distributor 12 is arranged, which distributes the supplied liquid substantially uniformly over the inlet side of the separator. If necessary additional flow distributors can be arranged in the inlet chamber, e.g. in the form of one or more slotted plates, and, in particular, the slots can be directed more or less transversely to the inclined plates of the separator. In the outlet chamber 11 an overflow weir 13 is mounted, determining the water level in the separator, and, if floating components are collected in the space 8', a dip weir 13' will be provided for arresting the floating components. The outlet chamber 11 communicates, moreover, with a discharge duct 14.

The use of a cross-flow separator is favourable, since, then, the tank 1 can be horizontally arranged, and the liquid flow is passed substantially horizontally. The inclination of the plates required for removing the separated components is, then, directed transversally to the flow direction. The plates of this assembly 7 are corrugated plates, and the separated heavy components will collect in the valleys thereof, and will be shielded by the corrugations from being entrained by the water flow. This is a second advantage of such a separator, which, at restricted dimensions, allows to obtain nevertheless a favourable separation effect.

The corrugated plates of the assembly 7 can, for instance, be supported on the partitions 5, so that at the lower side the corrugation tops, and at the upper side the corrugation valleys, will bear against these partitions. The valleys and tops respectively will, then, be separated from the adjacent partition, so that, there, a discharge opening for the heavy or light component respectively will be present. It is also possible to provide in these regions transverse partitions, which are shown in FIG. 2 at 15 with interrupted lines, which transverse partitions define discharge channels and suppress shunt flows outside the plate assembly, and, moreover, these transverse partitions will support the corrugated plates 7.

The part 2 comprises a pair of water filters 16 which, by means of valves 17, can be connected to the duct 14, and their discharge sides can be connected to a discharge duct 18. These filters comprise a suitable filter material, in particular sand, which is often present at the utilisation site, so that, then, the filters can be transported empty. The filters 16 are designed to be used alternately, and the not used filter can be purified by means of a backward water flow.

Furthermore the part 1 is provided with a coalescence apparatus in which separable components are made more separable by particle growth, so that the separation effect of the separator 7 is improved. This particle growth is a consequence of velocity differences in the water flow which are caused by wall friction in a tube, so that entrained particles will obtain different velocities and will overtake one another, which increases the coalescence probability.

In the case shown the coalescence tube 19 is provided in a single or multiple winding around the tank, one extremity thereof being provided with a supply connection 20, the other end being connected to the distributor 12. Providing such a tube is simple, particularly on a cylindrical tank, and the over-all dimensions of the device will hardly be increased.

Preferably the tube 19 consists of an elastic material which is resistant against corrosion by the water to be treated and/or auxiliary substances added thereto, e.g. a plastics such as neoprene. A first advantage thereof is that such a plastics hose is less heavy than a metal tube. Moreover a plastics hose can be wound more easily than a metal tube, so that replacement in case of damage or obstruction can take place also at the utilisation site without needing bending tools. A particular advantage is, furthermore, that such an elastic hose acts as a buffer, and protects the tank against impacts during transport. This holds in particular in the case that the tank is lowered by means of a parachute, and hits the earth with some velocity.

During transport the part 1 can be detached from the frame 3 if this will facilitate the transport, e.g. when lorries with a restricted loading space are to be used, or when transport takes place by aeroplane, and in particular the device is to be lowered by means of parachutes.

The addition of separation promoting auxiliary substances, disinfectants etc. can take place in any point, and in particular also before entry into the coalescence tube 19, and in particular measuring pumps can be utilised to that end. Storage vessels for such substances can be mounted on the frame 3, but, in particular, also the chambers 9 can be used for storing such substances.

I claim:

1. In a portable water purification device having a tank with an inlet and an outlet chamber and a plate separator arranged there between, which inlet chamber communicates with a supply connection, and which outlet chamber communicates with a filter assembly, the improvement comprising a tube coalescence apparatus between the supply connection and the inlet chamber having the form of a tube of resilient material wound around the tank in a single or multiple winding, said tube protecting said tank against damage from impact suffered during transport.

2. The device of claim 1, wherein said tube is a hose made of an elastic material.

3. The device of claim 2 wherein said elastic hose is made of a chemically resistant plastic.

4. The device of any one of claims 1-3, wherein said plate separator is a cross-flow separator having a longitudinal axis which is parallel to the longitudinal axis of the tank, the plates being parallel to this longitudinal axis, and the slope thereof being transversally directed to this longitudinal axis.

5. The device of claim 4, wherein said tank has a circular cross-section, and the plate separator a rectangular cross-section, the space intended for the plate separator inside the tank being defined by walls situated laterally thereof, said walls, together with the cylindrical tank wall, thus defining two chambers which can be used for storing water or auxiliary substances.

6. The device of claim 2 wherein said elastic hose is made of neoprene.

* * * * *